United States Patent [19]

Fouquer et al.

[11] Patent Number: 5,044,840

[45] Date of Patent: Sep. 3, 1991

[54] INDEXABLE CUTTING INSERT

[75] Inventors: Richard Fouquer; Jocelyn Gibert, both of Tours, France

[73] Assignee: Safety S. A., Boulogne-Billancourt, France

[21] Appl. No.: 401,173

[22] Filed: Aug. 31, 1989

[30] Foreign Application Priority Data

Sep. 29, 1988 [FR] France ............................... 88 12737

[51] Int. Cl.5 ............................................. B23D 15/28

[52] U.S. Cl. .................................. 407/114; 407/113; 407/115; 407/116

[58] Field of Search ............... 407/114, 113 X, 115 X, 407/116 X

[56] References Cited

U.S. PATENT DOCUMENTS 4,273,480 6/1981 Shirai et al. ......................... 407/114
4,846,609 7/1989 Bernadic et al. .................... 407/114

FOREIGN PATENT DOCUMENTS 3332821 5/1984 Fed. Rep. of Germany ...... 407/114

*Primary Examiner*—Frederick R. Schmidt
*Assistant Examiner*—Lawrence Cruz
*Attorney, Agent, or Firm*—Burns, Doane, Swecker & Mathis

[57] ABSTRACT

A cutting insert for chipforming machining of metal workpieces comprises opposed top and bottom surfaces and a peripheral wall extending therebetween. The insert has cutting edges at the juncture between the peripheral wall and at least the top surface and the peripheral wall. A land area and a chip breaker groove are located along the edges. The chip breaker groove comprises a pair of concave end depressions and a series of concave intermediate depressions disposed between the end depressions. The portions of the cutting edge disposed along the end depressions are straight and longer than portions of the cutting edge disposed along the intermediate depressions, the latter being wavy in shape.

10 Claims, 2 Drawing Sheets

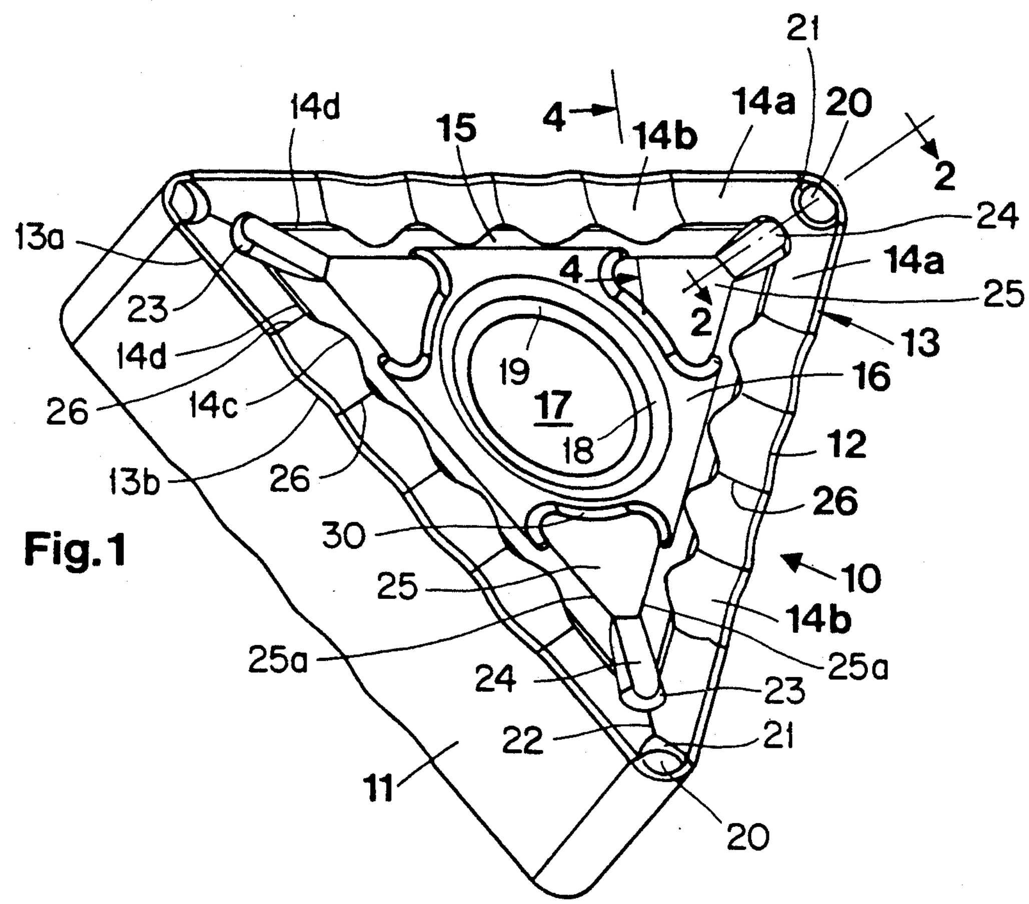
Fig. 1
Fig. 2
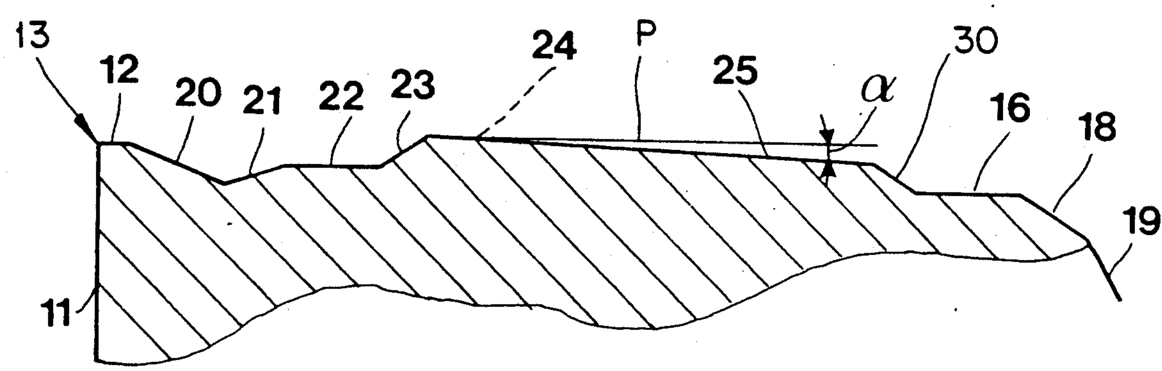

INDEXABLE CUTTING INSERT

BACKGROUND OF THE INVENTION

The present invention relates to a cutting insert for the chipforming machining of metal workpieces, and in particular to triangular, square, rhombic, rhomboidal or other forms of indexable cutting inserts used with tool holders.

The basic form of such cutting inserts comprises two opposed top and bottom surfaces and a peripheral wall extending therebetween, the cutting edges being formed by the intersection of the top and bottom surfaces and the peripheral wall of the insert. The top surface of the insert is a chip face or a surface which is in contact with the chip formed during the cutting operation. The peripheral wall is a clearance face in relation to the workpiece. The insert can be indexed to place the cutting edges of the top surface successively in an active position. Also, the insert can be inverted so that the bottom surface becomes the top surface and presents a new set of cutting edges.

It is generally desirable that these inserts should have a geometry that will minimize the power required in the metal working operations by controlling the geometry of the chips produced and that the insert chip control geometry should be capable of controlling chips over a wide range of parameters such as depth of cut or feed rate.

SUMMARY OF THE INVENTION

In a broad aspect of the invention, a cutting insert comprises a polygonal body of wear resistant material including opposed top and bottom surfaces and peripheral walls therebetween with cutting edges formed at the intersection between the peripheral walls and at least one of the top and bottom surfaces. A chip breaker groove provided along the cutting edges is constituted by a number of concave depressions, the end depressions of which are disposed adjacent respective corner of the insert. Those end depressions have a length that exceeds the length of intermediate concave depressions disposed between the end depressions. The cutting edge is straight along those end depressions, whereas the cutting edge is wave-shaped along the intermediate depressions as the insert is viewed in side elevation.

In a particular aspect of the invention, a secondary depression is provided in each corner which is defined by a sloping flat surface that extends from the inner margin of a land provided along each edge and extends downwards to a position below the level of a pair of end depressions disposed at that corner. There is also provided a raised elongated rib portion extending along a corner bisector line while being spaced at a distance from the inner end of the secondary corner depression.

In a more particular aspect of the invention there is provided a flat top surface on the raised rib portion along the bisector in each corner whereby the flat tops of the ribs are located in a common horizontal plane that is located above the horizontal plane of a flat land area that extends around each rounded corner region.

BRIEF DESCRIPTION OF THE DRAWINGS

The objects and advantages of the invention will become apparent from the following detailed description of a preferred embodiment thereof in connection with the accompanying drawings, in which like numerals designate like elements, and in which:

FIG. 1 is a perspective view of one embodiment of an indexable cutting insert according to the invention;

FIG. 2 is a sectional view taken along the line 2—2 in FIG. 1;

DETAILED DESCRIPTION OF A PREFERRED EMBODIMENT OF THE INVENTION

Figure 3:
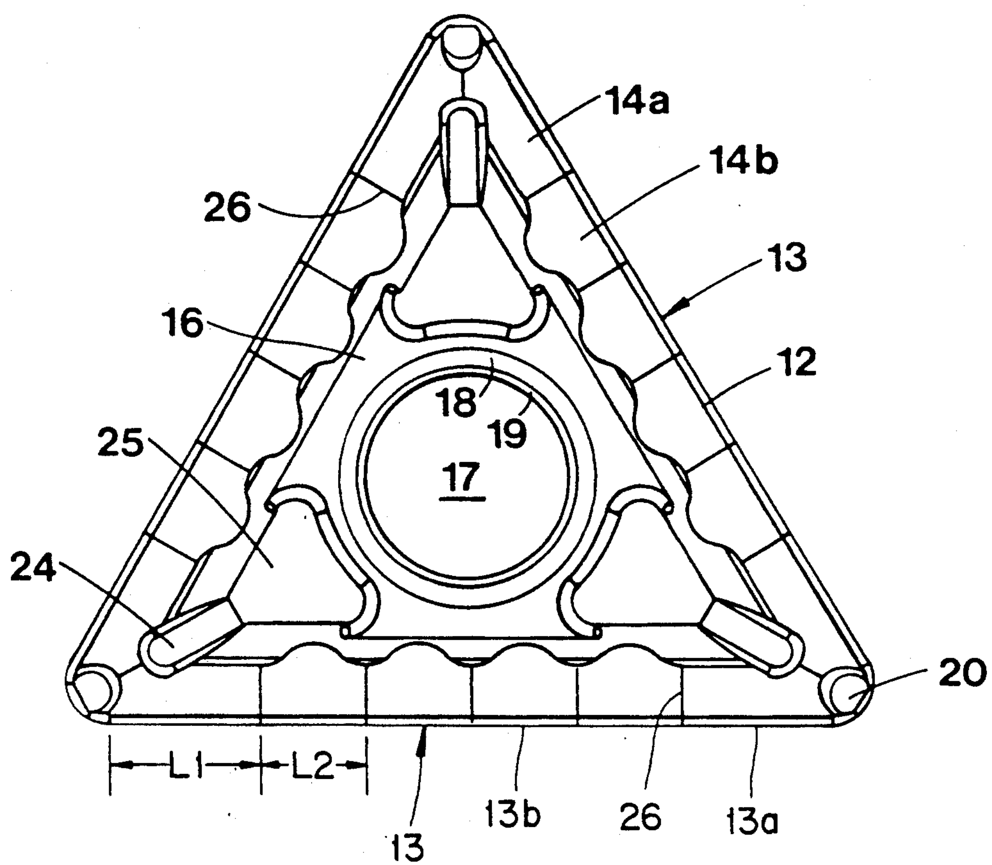
FIG. 3 is a plan view of the cutting insert shown in FIG. 1.

The cutting insert 10 includes a body of wear resistant material having substantially triangular top and bottom chipbreaking surfaces joined by side walls 11 with rounded corners whereby the side wall 11 is in perpendicular relation to planes containing the top and bottom chipbreaking surfaces. A land area 12 extends about the periphery of each of the top and bottom chipbreaking faces. Each of three indexable cutting edges 13 is defined by the intersection of a side wall 11 and a land area 12.

The top and bottom chipbreaking surfaces are preferably identical whereby the insert can be inverted to present three new cutting edges. Whichever of the chipbreaking surfaces constitutes the bottom face will rest against a floor of a holder recess.

A chip breaker groove along each cutting edge is composed of a row of concave depressions 14*a*, 14*b* which extend inwardly from the land area 12. Each row of depressions includes a pair of end depressions 14*a* disposed adjacent respective corners of the insert, and a series of intermediate depressions 14*b* extending between the pair of end depressions. Each end depression 14*a* intersects an end depression 14*a* associated with another row of depressions to form a line of intersection 22. Each row of depressions joins a curved surface 15. The curved surface 15 joins a planar surface 16 formed around a central aperture 17. The surface 16 is oriented perpendicular to the side wall 11. The aperture 17 is defined by two obtuse angled walls 18, 19 adapted for the receipt of a suitable locking pin employed to clamp the insert into a recess of a tool holder.

At each cutting corner region there is a corner depression defined by a sloping flat surface 20 that extends downwards in between two adjacent end depressions 14*a* to a lower level than the latter. The flat surface 20 extends from the inner margin of the land along the bisector line 2—2 to a position where it is joined by an upwardly sloping area 21 followed by the intersection line 22 lying on the bisector line 2—2. The intersection line 22, which is disposed below the plane of the land 12, joins another upwardly sloping area 23 which extends upwards to a raised elongated rib having a flat top surface 24. The top surface 24 is elongated in the direction of the bisector line 2—2 and extends to a triangular shaped area 25 which is slightly inclined downwards towards the center of the insert and confined by straight edges 25*a* which diverge towards the center of the insert. The taper angle $\alpha$ of surface 25 should be small, preferably greater than zero degrees and not greater than about two degrees relative to a horizontal plane. A downwardly inclined surface 30 extends from the inner end of the inclined surface to the angled hole wall 18.

The rib top surface 24 is flat and located at an associated corner region. When the insert is seated in a holder recess, one of the chipbreaker surfaces will rest upon a floor of the recess. The rib top surfaces 24 of that chipbreaker surface will abut the recess floor. For that purpose the top surfaces 24 are flat and located in a common horizontal plane P located above a horizontal plane in which the land portion 12 lies. As furthermore appears in plan view, i.e., in FIG. 3, the inner edge of each intermediate depression 14*b* has a wavy shape 14*c* at its intersection with the curved surface 15 as the top surface is viewed in plan (FIG. 3). As the insert is viewed in side elevation, the portions 13*b* of the cutting edges extending along the intermediate depressions 14*b* together define a wave shape (see FIG. 1), whereas the portions 13*a* of the cutting edges which extend along the end depressions 14*a* are straight.

Each concave depression 14*a* and 14*b* has a smooth concave shape as it descends to the line of intersection with the inner curved surface 15. As a consequence of this design, this insert will have a chip breaker groove constituted by a number of concave depressions 14*a*, 14*b* intersecting each other along the cutting edge while forming raised, smoothly curved ridges 26 therebetween which are oriented substantially perpendicular in relation to the cutting edge 13, as the top surface is viewed in plan (FIG. 3).

The concave end depressions 14*a* form a straight line of intersection 14*d* with the inner curved surface 15. Preferably, the length L1 of each end depression 14*a* is larger, suitably 1.5 to 2 times larger than the length L2 of each intermediate depression 14*b* as the top surface is viewed in plan (FIG. 3).

Figure 4:
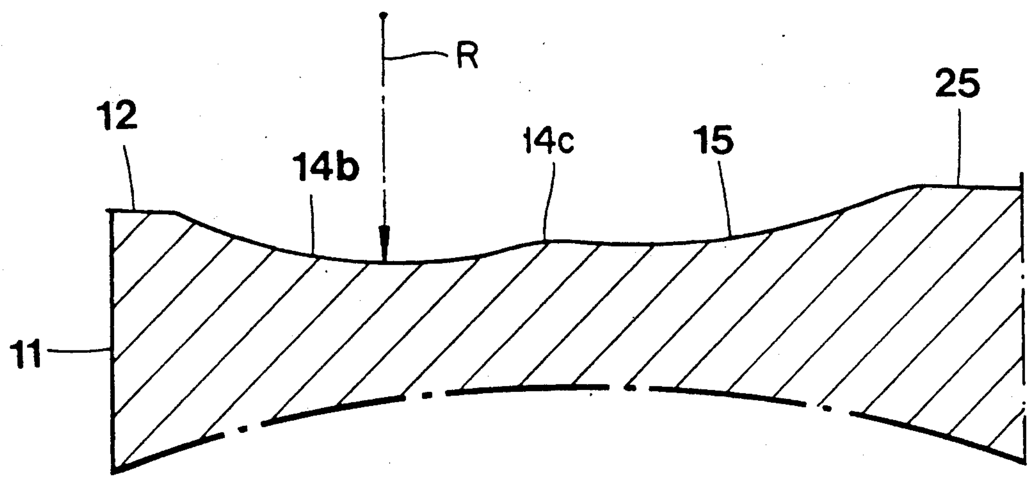
FIG. 4 is a sectional view taken along the line 4—4 in FIG. 1.

It is found suitable to design each concave intermediate depression 14*b* to be non-spherical such that it has two different radii of curvature, namely, a first radius of curvature R extending parallel to the cutting edge (FIG. 4) and a second radius of curvature which extends perpendicular to the first radius and which is visible when viewing the depression 14*b* perpendicularly to the cutting edge 13.

The insert according to the present invention is particularly adapted to make cuts at small and medium feed rates while simultaneously reducing cutting forces and temperatures so as to increase the strength and lifetime of the insert.

When such an insert is used for finishing, the cut has a small depth and the width of the chip is small, and the chip is thinner than in rough machining. The corner depression 20 of this insert combined with the raised rib 24 will break this thinner chip because of the sharp bend. When machining at a greater cutting depth the chip is thin but broader and thus extends an appreciable distance along the cutting edge. For breaking such chips, the main chip breaker is constituted by a number of concave depressions 14*a*, 14*b* separated by smoothly curved ridges 26. Hence, the insert may be utilized to machine cuts with varying chip loads while simultaneously reducing cutting forces and temperatures thereby increasing the insert's strength and lifetime.

The provision of the flat tops 24 enables the insert to be invertible whereby the flat tops 24 will engage the holder. By this arrangement the insert will have a very stable support against a pocket of the tool holder.

Although the present invention has been described in connection with a preferred embodiment thereof, it will be appreciated by those skilled in the art that additions, modifications, substitutions, and deletions not specifically described may be made without departing from the spirit and scope of the invention as defined in the appended claims.

What is claimed is:

1. Cutting insert for chipforming machining of metal workpieces, comprising a polygonal body of wear resistant material including opposed top and bottom surfaces and a plurality of side walls extending therebetween, a plurality of cutting edges formed by the intersection of said side walls and at least one of said top and bottom surfaces, pairs of said cutting edges converging toward respective corners of said insert, said corners including curved corner cutting edge portions, a continuous land area extending inwardly from said cutting edge toward a center of the insert, a chip breaker groove located along each cutting edge inwardly of the associated land area, said chip breaker groove comprising a row of concave depressions extending along each cutting edge, said row of concave depressions including a pair of end depressions arranged at opposite ends of the associated cutting edge and situated adjacent respective corners of said insert, and a series of intermediate depressions extending between said pair of end depressions, said end depressions extending along respective end portions of a respective cutting edge, and said intermediate depressions extending along respective intermediate portions of a respective cutting edge, said end portions of adjacent cutting edges being separated by respective ones of said curved corner cutting edge portions, each of said cutting edge end portions being longer in length than each of said cutting edge intermediate portions as said top surface is viewed in plan, said cutting edge end portions being straight as said insert is viewed in side elevation and in top plan, and said cutting edge intermediate portions forming a wave shape as said insert is viewed in side elevation.

2. Cutting insert according to claim 1 including a secondary depression disposed at each corner and comprising a generally flat sloping surface extending downwardly and inwardly from said land between two of said end depressions to a level below that of said two end depressions.

3. Cutting insert according to claim 2 including a raised rib portion disposed inwardly from each secondary depression and including a flat top which is elongated in a direction defined by a bisector line of the respective corner.

4. Cutting insert according to claim 3, wherein said top and bottom surfaces are of identical construction and said side walls intersecting said bottom surface to form cutting edges therewith.

5. Cutting insert according to claim 3 including a generally triangular flat surface extending inwardly from an inner end of said flat top at an acute angle relative to a plane defined by said flat top, said triangular surface including straight side edges which diverge inwardly.

6. Cutting insert according to claim 3, wherein said flat tops lie in a common plane located at an elevation higher than that of the portions of said land area disposed at said corners.

7. Cutting insert according to claim 1 including an inner surface extending inwardly from each row of concave depressions, said inner surface extending upwardly from a line of intersection of said inner surface with said row of concave depressions, said line of intersection between said inner surface and said intermediate depression being of wave shape as said top surface is viewed in plan, and the intersection between said inner surface and said end depressions being straight as said top surface is viewed in plan.

8. Cutting insert according to claim 1, wherein said intermediate depressions of each said row intersect one another along raised smoothly curved edges oriented perpendicularly to the associated cutting edge as said top surface is viewed in plan.

9. Cutting insert according to claim 1, wherein each of said intermediate depressions is formed by first and second different radii, said first radius extending parallel to the cutting edge, and said second radius extending perpendicular to said first radius, said first radius being larger than said second radius.

10. Cutting insert according to claim 1, wherein said top and bottom surfaces are of identical construction, and said side walls intersect said bottom surface to form cutting edges therewith.

* * * * *